Patented May 14, 1940

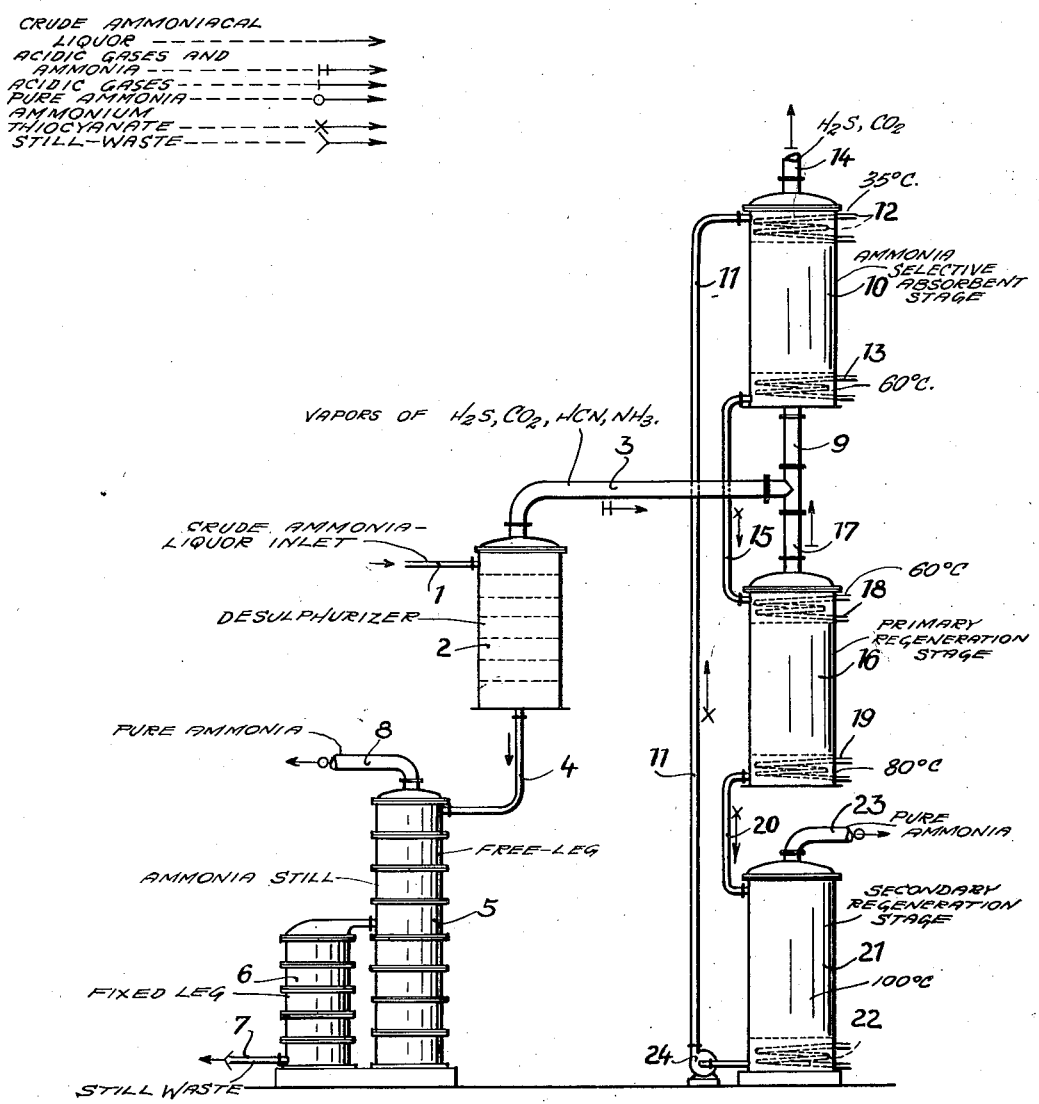

2,200,400

UNITED STATES PATENT OFFICE 2,200,400

PROCESS FOR THE REMOVAL OF ACID IMPURITIES FROM AMMONIACAL LIQUOR

Heinrich Söllner, Essen, Germany, assignor, by mesne assignments, to Koppers Company, Pittsburgh, Pa., a corporation of Delaware Application June 24, 1937, Serial No. 150,023
In Germany June 29, 1936

1 Claim. (Cl. 23—193)

The invention relates to the removal of acid impurities, such as hydrogen sulphide, carbonic acid and other constituents, from ammoniacal liquor, whereby the ammoniacal liquor to be purified is subjected to a heat treatment at such temperatures, at which the acid impurities will escape together with the vapours produced.

It is well known that the acid impurities can be driven-off from ammoniacal liquor, e. g. by heating the ammoniacal liquor to a temperature of about 100° C. While the acid impurities are almost completely removed at this temperature at the same time, however, a considerable amount of ammonia likewise escapes, so that only a small portion of ammoniacal liquor is recovered as a clean product.

The present invention has for its object to remove the acid impurities from ammoniacal liquor without however showing an appreciable loss of ammonia.

The process according to the present invention involves subjecting the vapours produced by the heating-up of the ammoniacal liquor for the purpose of separating the acid impurities from the ammoniacal liquor, which vapours contain the acid impurities and an essential amount of ammonia, to treatment with a suitable selective solvent for ammonia, hydrogen sulphide, carbonic acid etc. Such solvent should be able to take-up ammonia at comparatively low temperatures, but not all or only to a small extent the acid impurities, such as carbonic acid, hydrogen sulphide etc., which solvent will give off, upon increasing its temperature, first of all the acid impurities and only after that the ammonia.

The preferred selective solvent used according to the invention is an aqueous solution of ammonium thiocyanate of an increased concentration containing e. g. 400 grams of ammonium thiocyanate per liter.

According to the invention, the mixture of vapours produced during desulphurization by the heating-up of the crude ammoniacal liquor is treated at a low temperature in a selective absorbent stage with a solution of ammonium thiocyanate, preferably in a column of standard design. The temperature of the solution is controlled, so that all ammonia is absorbed from the vapour mixture, but no acid impurities, or only a part of them. The solution of ammonium thiocyanate is then brought to higher temperatures in separate primary and secondary regeneration stages, in which case first of all, all dissolved acid impurities are driven-off and thereafter, finally the pure ammonia, if necessary.

In order that this invention may be more readily understood and carried into practice, reference is hereby made to the accompanying drawing, showing the methods for carrying out the process according to the invention.

The crude ammoniacal liquor to be dealt with flows through the pipe line 1 into an acidic gas removing or desulphurizing apparatus 2, in which it is heated to such a high temperature, that all the acid impurities such as hydrogen sulphide, carbonic acid or the like, together with a certain amount of the so-called free ammonia, will escape through the pipeline 3.

The ammoniacal liquor, freed from these acid impurities, then passes through the pipe line 4 and from here into a commonly well known ammoniacal liquor distilling plant (ammonia still), comprising the column 5 for free ammonia and the column 6 for fixed ammonia. The stillwaste liquor freed from ammonia then enters the pipe line 7, whereas pure ammonia is withdrawn through the pipe line 8.

The vapour mixture separated in the acidic gas removing or desulphurizer apparatus 2 is led through the pipe line 3 and the adjacent pipe line 9 into an ammonia selective absorbent stage comprising a column 10. The vapour mixture is brought into contact in this column with a concentrated solution of ammonium thiocyanate, which has been delivered to the column through pipe line 11. There is a cooling device 12 in the upper part of the column 10 and cooling devices 13 in the bottom part of the column. The temperature of thiocyanate is controlled in the column 10 by means of a suitable adjustment of the cooling device, so that the temperature of the vapours in the upper part of the column amounts to about 35° C. and in the lower part to about 60° C. If these temperatures are maintained, the acidic gases, hydrogen sulphide together with carbonic acid will escape from the column 10 through the pipe line 14, whereas the ammonia is kept dissolved in the solution of thiocyanate.

The solution of thiocyanate, enriched with ammonia, which, however, still contains small amounts of dissolved acidic gaseous impurities, flows from the bottom of the column 10 through the pipe line 15 into a primary regeneration stage comprising second column 16, which is connected with the pipe line 9, leading to the column 10 by means of the pipe line 17. The column 16 is fitted with heating arrangements 18 and 19, so that the liquid respectively the vapour mixture is heated to such a degree, that the liquid and the vapours in the upper part of the column 16 have a temperature of about 60° C. and in the lower part of the column a temperature of about 80° C. All acidic gaseous impurities are driven-off from the solution at this temperature, whereas the ammonia in the solution of thiocyanate is kept in dissolved condition.

The solution of thiocyanate now flows through the pipeline 20 into a secondary regeneration stage comprising a column 21, which is fitted with a heating device 22. The solution of thiocyanate is heated in this apparatus to a temperature of about 100° C. Only when the liquid is heated to this temperature will the whole quantity of ammonia be driven off from the solution of thiocyanate with the result that practically pure ammonia can be withdrawn from the column 21, through the pipeline 23.

Finally, the solution of thiocyanate freed from ammonia is circulated by means of a pump 24, through the pipeline 11, back again into the column 10. For separating the ammonia from the acid impurities, the same solution is repeatedly used.

This new process can also be operated at a reduced or, more particularly, at an increased temperature.

I have described my present invention on the lines of a preferred embodiment thereof, but my invention is not limited in all its aspects to the mode of carrying it out as described and shown since the invention may be variously embodied within the scope of the following claim.

I claim:

In a process for the removal of acidic gaseous constituents such as $H_2S$, $CO_2$, and the like from ammoniacal liquor which comprises: preliminarily desulphurizing the ammoniacal liquor by expelling the acidic gaseous constituents and only part of the ammonia therefrom as vapours, and thereafter distilling the residual ammonia liquor to liberate residual free and fixed ammonia free of acidic gases; subjecting the vapors from the desulphurizing step to selective absorption of ammonia in a separate stage by counterflow treatment with a downflow solution of ammonium thiocyanate to preferentially absorb all of the ammonia and only a minor portion of the acidic gases; releasing the unabsorbed acidic gases from the process at the upper region of the selective absorbent stage; regenerating the selective absorbent solution by distilling the same in separate primary and secondary regeneration stages with passage of the liquid serially through the same from top to bottom of the respective stages, and thence from the bottom of the secondary regeneration stage back into the upper region of the selective absorbent stage and with passage of the vapours driven off in the primary regeneration stage from the upper part of the same into the bottom of the selective absorbent stage; the improvement comprising: maintaining the temperatures of the vapors in the upper part of the selective absorbent stage at about 35° C. and in the lower part at about 60° C., and in the primary regeneration stage maintaining a temperature of about 60° C. in the upper part and a temperature of about 80° C. in the lower part, and in the secondary regeneration stage maintaining a temperature of about 100° C.; removing the ammonia liberated in the secondary regeneration stage from the process at the upper part of said stage; and removing the ammonia liberated from the free and fixed ammonia in the aforesaid distilling step from the process at the distilling step as substantially pure ammonia vapours and by-passing the preliminary desulphurizing, selective absorbent, and regeneration steps, with all of said substantially pure ammonia vapors.

HEINRICH SÖLLNER.